United States Patent
Lim et al.

(10) Patent No.: US 10,414,838 B2
(45) Date of Patent: *Sep. 17, 2019

(54) METHOD FOR PREPARING VINYL CHLORIDE-BASED POLYMER AND VINYL CHLORIDE-BASED POLYMER PREPARED BY THE SAME

(71) Applicant: LG CHEM, LTD., Seoul (KR)

(72) Inventors: Joong Chul Lim, Daejeon (KR); Hyun Kyou Ha, Daejeon (KR); Yang Jun Jeon, Daejeon (KR); Jin Hyuck Ju, Daejeon (KR); Min Jeong Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/760,158

(22) PCT Filed: Mar. 14, 2017

(86) PCT No.: PCT/KR2017/002764
§ 371 (c)(1),
(2) Date: Mar. 14, 2018

(87) PCT Pub. No.: WO2017/188594
PCT Pub. Date: Nov. 2, 2017

(65) Prior Publication Data
US 2018/0265608 A1 Sep. 20, 2018

(30) Foreign Application Priority Data

Apr. 25, 2016 (KR) .................. 10-2016-0049960

(51) Int. Cl.
| | |
|---|---|
| *C08F 2/18* | (2006.01) |
| *C08F 14/06* | (2006.01) |
| *C08K 5/13* | (2006.01) |
| *C08F 2/44* | (2006.01) |
| *C08K 5/138* | (2006.01) |

(52) U.S. Cl.
CPC ............... *C08F 14/06* (2013.01); *C08F 2/18* (2013.01); *C08F 2/44* (2013.01); *C08K 5/13* (2013.01); *C08K 5/138* (2013.01)

(58) Field of Classification Search
CPC ... C08F 2/18; C08F 2/44; C08F 14/06; C08K 5/13
See application file for complete search history.

(56) References Cited

U.S. PATENT DOCUMENTS

| | | | |
|---|---|---|---|
| 3,160,619 A * | 12/1964 | Delacretaz | C08F 2/38 526/201 |
| 6,433,074 B1 * | 8/2002 | Ooura | C08F 14/06 524/349 |
| 2009/0281255 A1 * | 11/2009 | Dirix | C08F 214/06 526/64 |
| 2010/0247786 A1 * | 9/2010 | Schroeder | C08F 236/10 427/388.1 |

FOREIGN PATENT DOCUMENTS

| | | |
|---|---|---|
| JP | 6238378 B2 | 1/1987 |
| KR | 20020045353 A | 6/2002 |
| KR | 101199094 B1 | 11/2012 |
| KR | 20150042727 A | 4/2015 |

OTHER PUBLICATIONS

Magdy W. Sabaa, et al., Organic thermal stabilizers for rigid poly(vinyl chloride) VIII. Phenylurea and phenylthiourea derivatives, Polymer Degradation and Stability, 2003, vol. 81, No. 1, pp. 37-45.

* cited by examiner

*Primary Examiner* — Bijan Ahvazi
(74) *Attorney, Agent, or Firm* — Dentons US LLP

(57) ABSTRACT

The present invention provides a method for preparing a vinyl chloride-based polymer comprising performing suspension polymerization of vinyl chloride-based monomer, wherein an aromatic hydrocarbon-based compound is added when a pressure change is 0.5 to 1.5 kg/cm$^2$ with respect to an equilibrium pressure at a polymerization temperature in a polymerization reactor after the vinyl chloride-based monomer is added to the polymerization reactor, wherein the aromatic hydrocarbon-based compound comprises a reactive functional group having an intracarbon double bond and a hydroxyl group; and a vinyl chloride-based polymer prepared by the method and having a high polymerization degree and excellent fusion processability.

8 Claims, No Drawings

METHOD FOR PREPARING VINYL CHLORIDE-BASED POLYMER AND VINYL CHLORIDE-BASED POLYMER PREPARED BY THE SAME

This application is a National Stage Application of International Application No. PCT/KR2017/002764, filed Mar. 14, 2017, and claims the benefit of Korean Patent Application No. 10-2016-0049960, filed on Apr. 25, 2016, contents of which are incorporated herein by reference in their entirety for all purposes as if fully set forth below.

CROSS-REFERENCE TO RELATED APPLICATIONS

This application claims the benefit of Korean Patent Application No. 10-2016-0049960, filed on Apr. 25, 2016, in the Korean Intellectual Property Office, the disclosure of which is incorporated herein in its entirety by reference.

TECHNICAL FIELD

The present invention relates to a method for preparing a vinyl chloride-based polymer capable of improving fusion processability of a high-polymerization-degree vinyl chloride-based polymer, and a vinyl chloride-based polymer prepared by the same.

BACKGROUND ART

Vinyl chloride-based polymer is homopolymer of vinyl chloride or copolymer containing 50% or more of vinyl chloride, wherein it has various application fields due to inexpensive, easy to control hardness, and applicable in most processing apparatuses. Furthermore, the vinyl chloride-based polymers may provide molding articles having excellent physical and chemical properties, such as mechanical strength, weather resistance, chemical resistance, and thus, have been widely used in various fields. However, since the vinyl chloride-based polymer by itself has low molding processability per se, various additives, such as a plasticizer and the like, are properly added to provide processability.

In related arts, as a method for improving the processability of vinyl chloride-based polymer, a method for improving the processability of vinyl chloride-based polymer itself by using a dispersion stabilizer such as polyvinyl alcohol during polymerization of vinyl chloride-based polymer was proposed. However, according to the above-mentioned method, there was a limitation in that the bulk specific gravity of the vinyl chloride-based polymer was increased, but the fusion processability of the polymer was decreased.

Accordingly, as a method for improving both the processability and the fusion property of vinyl chloride-based polymers, a method of adjusting a polymerization degree distribution property by changing a temperature during polymerization reaction of the vinyl chloride-based polymers was proposed. However, according to the above-mentioned methods, although vinyl chloride-based polymers having a high bulk density and improved processability may be prepared, the polymerization reaction time is increased and productivity is thereby decreased. In addition, due to a side reaction between reaction products such as vinyl chloride-based monomer and additives in response to a change in polymerization temperatures, there were limitations of decrease in the own material property characteristics of the polymers such as increase in coloration properties and decrease in mechanical properties.

As another method for improving the processability of vinyl chloride-based polymers, a method, in which a plasticizer is used together with the vinyl chloride-based polymers when a molding article is manufactured, has been mainly used. However, when the plasticizer is used as such, there is a problem in that the plasticizer moves to the surface of a product, and sticking thereby occurs on the surface, and plasticity gradually decreases as time goes by. In particular, phthalate plasticizers which are mainly used have limitations of exhibiting flexibility at substantially high temperatures, and requiring high energy during processing.

In particular, the vinyl chloride-based polymer having a high polymerization degree has a long fusion time and thereby has a limitation of remarkable decrease in productivity of processed molding article. When a processing temperature is raised to solve this, discoloration occurs due to structural properties of vinyl chloride-based polymers. In addition, when a plasticizer is added during processing, the processing may be performed at a low temperature, but there is a concern about decreasing the material property of a processed molding article, and therefore, a use amount is restricted.

Thus, a method for manufacturing vinyl chloride-based polymers capable of preparing high-polymerization-degree vinyl chloride-based polymers having excellent fusion proccessability with excellent polymerization productivity is required to be developed.

DISCLOSURE OF THE INVENTION

Technical Problem

An aspect of the present invention solves the above-mentioned limitations and provides a method for preparing a vinyl chloride-based polymer capable of improving fusion processability of high-polymerizaion-degree vinyl chloride-based polymers.

Another aspect of the present invention provides a vinyl chloride-based polymer prepared by using the manufacturing method and a vinyl chloride resin composition including the same.

Technical Solution

To solve the above-mentioned tasks, according to an embodiment of the present invention, there is provided a method for preparing a vinyl chloride-based polymer including performing suspension polymerization of vinyl chloride-based monomer, wherein an aromatic hydrocarbon-based compound is added when a pressure change is 0.5 to 1.5 kg/cm$^2$ with respect to an equilibrium pressure at a polymerization temperature in a polymerization reactor after the vinyl chloride-based monomer is added to the polymerization reactor, and wherein the aromatic hydrocarbon-based compound comprises a reactive functional group having an intracarbon double bond and a hydroxyl group.

According to another aspect of the present invention, there is provided a vinyl chloride-based polymer prepared by using the preparing method and having a polymerization degree of 1300 to 3000.

According to still another aspect of the present invention, there is provided a vinyl chloride resin composition including a vinyl chloride-based polymer prepared by using the preparing method.

Advantageous Effects

A method for preparing a vinyl chloride-based polymer according to the present invention may improve the fusion processability of prepared vinyl chloride-based polymer by adding, at the last stage of suspension polymerization, an additive capable of improving the fusion processability of the vinyl chloride-based polymer.

MODE FOR CARRYING OUT THE INVENTION

Hereinafter, the present invention will be described in more detail to allow for a clearer understanding of the present invention.

Terms or words used in the specification and claims should not be interpreted as limited to a commonly used meaning or a meaning defined dictionaries, and should be interpreted as having a meaning that is consistent with their meaning in the context of the technical idea of the invention, based on the principle that an inventor may properly define the meaning of the words or terms to best explain the invention.

In general, when preparing a vinyl chloride-based polymer by suspension polymerization, whereas before a critical conversion, a pressure is maintained by maintaining a phase equilibrium state between a liquid phase and a gas phase, a phenomenon of pressure drop occurs while gas phase vinyl chloride-based monomer is consumed, after the critical conversion. In the present invention, an additive capable of improving the fusion processability of vinyl chloride-based polymer generated through a polymerization reaction is added at the time of a pressure drop to a specific level, and thus, the fusion processability of vinyl chloride-based polymer may be remarkably improved. As a result, when manufacturing a processed molding article by using this, it is possible to improve productivity.

Specifically, a method for preparing vinyl chloride-based polymer according to an embodiment of the present invention comprises performing suspension polymerization of vinyl chloride-based monomer, wherein an aromatic hydrocarbon-based compound is added when a pressure change is 0.5 to 1.5 kg/cm$^2$ on the basis of an equilibrium pressure at a polymerization temperature in a polymerization reactor after the vinyl chloride-based monomer is added to the polymerization reactor, and wherein the aromatic hydrocarbon-based compound comprises a reactive functional group having an intracarbon double bond and a hydroxyl group.

In the method for preparing vinyl chloride-based polymer according to an embodiment of the present invention, the aromatic hydrocarbon-based compound is present in a shape dispersed in the prepared vinyl chloride-based polymer, and while reacting with a radical in the prepared vinyl chloride-based polymer, a hydroxyl group in the aromatic hydrocarbon-based compound may complete a polymerization reaction of the vinyl chloride-based polymer by virtue of the stability of a radical resonance structure due to a benzene ring.

Specifically, the aromatic hydrocarbon-based compound may be a single-ring or multiple-ring aromatic hydrocarbon-based compound of 6 to 20 carbon atoms, includes a reactive functional group having an intracarbon double bond, a hydroxyl group, and optionally further includes an alkoxy group. Here, the alkoxy group may be an alkoxy group of 1 to 10 carbon atoms, and may be positioned at the meta-position on the basis of the hydroxyl group.

More specifically, the aromatic hydrocarbon-based compound may be the compound of Formula 1 below.

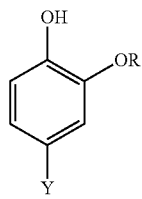

[Formula 1]

In Formula 1, R may be an alkyl group having 1 to 10 carbon atoms, more specifically, may be an alkyl group having 1 to 6 carbon atoms, and more specifically, may be a linear-chain alkyl group having 1 to 3 carbon atoms;

Y may be a reactive functional group which includes an intracarbon double bond, may be an alkenyl group having 2 to 10 carbon atoms such as a vinyl group, an allyl group, an isopropenyl group, a 2-butenyl group, or a 3-butenyl group, more specifically, may be an alkenyl group having 2 to 6 carbon atoms, and more specifically, may be an allyl group of 3 carbon atoms.

More specifically, the aromatic hydrocarbon-based compound may be eugenol (4-allyl-2-methoxy phenol), isoeugenol or the like, and any one thereof, or a mixture of two thereof may be used. Most specifically, the aromatic hydrocarbon-based compound is eugenol.

Eugenol is generally added when a process composition including vinyl chloride-based polymer is prepared, and functions to improve processability. However, as in related arts, when used in preparing vinyl chloride-based polymer, eugenol caused worsening of work environment because eugenol should be excessively added to achieve a sufficient effect of improving fusion processability, and due to the unique smell thereof. In addition, when added together with monomer at an initial stage of polymerization of vinyl chloride-based polymer, eugenol serves as a polymerization inhibitor to thereby inhibit a polymerization reaction, and thus, causes obtainment of vinyl chloride-based polymer with a low polymerization degree.

In comparison, in the present invention, the aromatic hydrocarbon-based compound is added in the last stage of suspension polymerization, specifically, at the time when a pressure change is 0.5 to 1.5 kg/cm$^2$ on the basis of an equilibrium pressure at a polymerization temperature in a polymerization reactor, and thus, vinyl chloride-based polymer having a high polymerization degree of 1300 to 3000 and improved fusion processability may be prepared. In this case, the polymerization temperature may be 40° C. to 60° C. and more specifically, 47° C. to 52° C. Outside the above-mentioned pressure change range, effects of obtaining a high polymerization degree and improving fusion processability may not be simultaneously obtained. More specifically, the aromatic hydrocarbon-based compound may be added at the time when the pressure change is 0.8 to 1.2 kg/cm$^2$ on the basis of the equilibrium pressure at the polymerization temperature in the polymerization reactor.

In addition, the aromatic hydrocarbon-based compound may be added in an amount of 0.005 to 0.1 parts by weight on the basis of 100 parts by weight of vinyl chloride-based monomer. When the added amount of aromatic hydrocarbon-based compounds is less than 0.005 parts by weight, there is little effect of improving a polymerization degree and fusion processability according to the addition, and when the added amount of aromatic hydrocarbon-based compounds is more than 0.1 parts by weight, there is little increase in improving effect with respect to the added amount. Thus, these cases are inefficient and there is a concern about decreasing the physical properties of the manufactured vinyl chloride-based polymer. More specifically, the aromatic hydrocarbon-based compound may be added in an amount of 0.01 to 0.1 parts by weight on the basis of 100 parts by weight of vinyl chloride-based monomer.

Meanwhile, in the method for preparing vinyl chloride-based polymer according to an embodiment of the present invention, the suspension polymerization may be performed by adding and reacting vinyl chloride-based monomer in a polymerization reactor, which is filled with a solvent, a polymerization initiator and selectively more than one of additives, such as a dispersant.

In this case, the "filled polymerization reactor" means a state in which before adding vinyl chloride-based monomer, a solvent, a polymerization initiator, and selectively additives such as a dispersant are added in the reactor.

In the present invention, "Before starting polymerization" means the state before adding vinyl chloride-based monomer in the filled reactor.'

The vinyl chloride-based polymer prepared by the method for preparing vinyl chloride-based polymer according to an embodiment of the present invention may be not only the polymer purely composed of vinyl chloride-based monomer but also copolymer of vinyl chloride-based monomers serving as a main component and vinyl-based monomer which may be copolymerized with the vinyl chloride-based polymer. In this case, when the vinyl chloride-based polymer is copolymer of vinyl chloride-based monomer and vinyl-based monomer, the content of the vinyl chloride included in the copolymer may be 50% or more.

Thus, the vinyl chloride-based monomer usable in the suspension polymerization may be a single substance of vinyl chloride, or may also be a mixture of vinyl chloride and vinyl-based monomer copolymerizable with the vinyl chloride. The vinyl-based monomer may include, but not particularly limited to: an olefin compound such as ethylene, propylene, butene; vinyl esters such as vinyl acetate, vinyl propionate, vinyl stearate; unsaturated nitriles such as acrylonitrile; vinyl alkyl ethers such as vinyl methyl ether, vinyl ethyl ether, vinyl octyl ether, vinyl lauryl ether; halogenated vinylidenes such as vinylidene chloride; unsaturated fatty acid such as acrylic acid, methacrylic acid, itaconic acid, maleic acid, fumaric acid, anhydrousmaleic acid, anhydrousitaconic acid, or an anhydride of these fatty acids; unsaturated fatty acid esters such as methyl acrylate, ethyl acrylate, maleic acid monomethyl, maleic acid dimethyl, maleic acid butyl benzyl; and crosslinkable monomer such as diallyl phthalate; or the like, and any one thereof or a mixture of two or more thereof may be used.

In addition, the solvent may be deionized water, the solvent may be used by appropriately adjusting the use amount thereof according to the size of the polymerization reactor and the used amount of monomer, for example, 70 parts by weight or more of the solvent may be used on the basis of 100 parts by weight of vinyl chloride-based monomer used in the suspension polymerization.

In addition, 0.02 to 0.2 parts by weight of the polymerization initiator may be used on the basis of 100 parts by weight of vinyl chloride-based monomer used in the polymerization. When less than 0.02 parts by weight of the polymerization initiator is used, the polymerization reaction time is lengthened, a conversion ratio into vinyl chloride-based polymer is lowered, and thus, there is a concern that the productivity is thereby decreased. When more than 0.2 parts by weight of the polymerization initiator is used, there is a concern that the initiator may not be completely consumed during the polymerization process, may be remained in slurry of the manufactured vinyl chloride-based polymer, and thus decrease thermal stability and the like. More specifically, 0.04 to 0.12 parts by weight of the polymerization initiator may be used on the basis of 100 parts by weight of vinyl chloride-based monomer.

Specifically, the polymerization initiator may include: a peroxide compound such as dicumyl peroxide, dipentyl peroxide, di-3,5,5-trimethylhexanoylperoxide, or dilaurylperoxide; a peroxydicarbonate-based compound such as diisopropylperoxydicarbonate, di-sec-butylperoxydicarbonate, or di-2-ethylhexylperoxydicarbonate; a peroxyester-based compound such as t-butylperoxy pivalate, 1,1,3,3-tetramethylbutylperoxy neodecanoate, or t-butylperoxy neodecanoate; an azo-based compound such as azobis-2,4-dimethylvaleronitrile; a hydroperoxide-based compound such as t-butyl hydroperoxide; or a sulfate-based compound such as potassium persulfate or ammonium persulfate; or the like, and any one thereof or a mixture of two or more thereof may be used.

In addition, the suspension polymerization may be performed in a temperature range of 40° C. to 60° C. and more specifically, 47° C. to 52° C. In addition, since in general, the polymerization of vinyl chloride-based polymer is an exothermic reaction, a heat control step through a reactor jacket and R/CN may be selectively further performed so that a temperature change is maintained in a range of 0.1° C. to 0.2° C. during suspension polymerization. Accordingly, the method for preparing vinyl chloride-based polymer according to an embodiment of the present invention may further include a heat control step for maintaining a polymerization temperature during suspension polymerization.

When a polymerization reaction is performed while a certain level of temperature is maintained within the polymerization temperature range as described above, foam generation may be prevented, repolymerization and scale generation may be suppressed, and decomposition of the remaining polymerization initiator at the last stage of the reaction may be induced. Thus, vinyl chloride-based polymer having further excellent physical property characteristics, that is, a high polymerization degree and improved fusion processability, may be prepared.

In addition, in the suspension polymerization, besides the above-described effective components, additives such as a dispersant (or also referred to as a protective colloid assistant), a polymerization regulator, a chain transfer agent, a pH regulator, an antioxidant, a crosslinker, an antistatic agent, an antiscalant, or a surfactant may further be added as needed. The kinds and contents of the additives are not particularly limited, and common well-known kinds and contents in the art may be used. The additives may be added at any time in the initial stage of the suspension polymerization, during the suspension polymerization, or after the suspension polymerization, and may be added in batches or continuously.

For example, the dispersant, which functions to stabilize reactants during polymerization and allow uniform and stabilized particles to be generated, may be added in an initial stage of the suspension polymerization. Specifically, the dispersant may include a vinyl alcohol-based resin, cellulose, or an unsaturated organic acid polymer, and any one thereof, or a mixture of two or more thereof may be used.

In addition, as the dispersant, a vinyl alcohol-based resin, specifically, having a hydration degree of 30 to 90 wt % may be used, and more specifically, a mixture of a first polyvinyl alcohol with a hydration degree of greater than 50 wt % and equal to or smaller than 90 wt % and a second poly vinyl alcohol with a hydration degree of 30 to 50 wt % may be used. In this case, a mixing ratio of the first and second polyvinyl alcohol is 2:1 to 1:2, specifically, 5:4 to 2:3.

In addition, as the dispersant, the cellulose may specifically include methylcellulose, hydroxyethylcellulose, hydroxypropylmethylcellulose, or the like, and one thereof, or a mixture of two or more thereof may be used. Among these, the cellulose may be hydroxypropylmethylcellulose, more specifically, in which a content of intramolecular hydroxypropyl group is 3 to 20 wt %, and viscosity of 2% aqueous solution thereof at 23±5° C. is 10 to 20,000 cps.

In addition, as the dispersant, the unsaturated organic acid polymer may specifically include an acrylic polymer, a methacrylic polymer, an itaconic polymer, a fumaric polymer, a maleic polymer, a succinic polymer, or the like, and any one thereof or a mixture of two or more thereof may be used.

More specifically, the dispersant usable in the suspension polymerization may include a mixture of a vinyl alcohol-based resin and a cellulose-based resin, and more specifically, a mixture with a mixing ratio of vinyl alcohol-based resin to cellulose-based resin of 5:1 to 7:7 (weight ratio).

The dispersant may be used in and amount of 0.005 to 5 parts by weight on the basis of 100 parts by weight of vinyl chloride-based monomer used in preparing vinyl chloride-based polymer. When the content of the dispersant is less than 0.005 parts by weight, particle sizes of vinyl chloride-based polymer excessively increase, and thus, there is a concern that a fish-eye occurs, and when the content of the dispersant is greater than 5 parts by weight, there is a concern that an initial coloration property is decreased due to an increase in the number of fine particles. In consideration of a remarkable effect of improving the polymerization efficiency and physical properties of vinyl chloride-based polymer due to the use of the dispersant, the dispersant may be used in and amount of 0.005 to 2.5 parts by weight on the basis of 100 parts by weight of vinyl chloride-based monomer.

In addition, the antioxidant functions to stop polymerization by reacting with radicals of the vinyl chloride-based polymer, and may be added at the last stage of suspension polymerization, more specifically, added together with the above-mentioned aromatic hydrocarbon-based compound. In the present invention, the amount of vinyl chloride-based monomer recovered after completing a reaction is measured with a flow rate meter, and the polymerization conversion ratio may be calculated from the measured amount. The polymerization conversion ratio includes an error range of ±2% at the time of measurement, and a polymerization conversion ratio of 0% has a meaning which includes the time of starting polymerization or a time till the start.

The antioxidant is not particularly limited if generally used in preparing vinyl chloride-based polymer, and specific examples may include: a phenolic compound, such as triethyleneglycol-bis-[3-(3-t-butyl-5-methyl-4-hydroxyphenyl)propionate], hydroquinone, p-methoxyphenol, t-butylhydoxyanisol, n-octadecyl-3-(4-hydroxy 3,5-di-t-butylphenyl) propionate, 2,5-di-t-butyl hydoquinone, 4,4-butylidenebis(3-methyl-6-t-butyl phenol), t-butyl catechol, 4,4-tio bis(6-t-butyl-m-crezol), tocopherol, or non dihydro guaretic acid; an amine compound, such as N,N-diphenyl-p-phenylenediamine, 4,4-bis(dimethyl benzyl)diphenylamine; and a sulfur compound, such as dodecyl mercaptane, 1,3-diphenyl-2-tiol, and any one thereof or a mixture of two or more thereof may be used.

The antioxidant may be used in and amount of 0.01 to 1 parts by weight on the basis of 100 parts by weight of vinyl chloride-based monomer used in preparing vinyl chloride-based polymer. When the content of the oxidant is less than 0.01 parts by weight, particle sizes of vinyl chloride-based polymer excessively increase, and thus, there is a concern that a fish-eye occurs, and when the content of the dispersant is greater than 1 parts by weight, there is a concern that an initial coloration property is decreased due to an increase in the number of fine particles. In consideration of a remarkable effect of improving polymerization efficiency and physical properties of vinyl chloride-based polymer due to the use of the antioxidant, the antioxidant may be used in and amount of 0.05 to 1 parts by weight on the basis of 100 parts by weight of vinyl chloride-based monomer.

The vinyl chloride-based polymer prepared according to the above-described method may exhibit a high polymerization degree and excellent fusion processability by adding an aromatic hydrocarbon-based compound comprising a reactive functional group having an intracarbon double bond together with a hydroxyl group, when a pressure change in a reactor is within a predetermined range during a suspension polymerization. As a result, when manufacturing a processed molding article by using this, it is possible to improve productivity.

Thus, according to another embodiment of the present invention, vinyl chloride-based polymer prepared according to the above-described method may be provided.

The vinyl chloride-based polymer may include not only a polymer purely composed of vinyl chloride-based monomer but also a copolymer of the vinyl chloride-based monomer, which serves as a main component, and vinyl-based monomer copolymerizable with the vinyl chloride-based monomer. In this case, when the vinyl chloride-based polymer is copolymer of vinyl chloride-based monomers and vinyl-based monomer, the content of the vinyl chloride included in the copolymer may be 50% or more. In this case, the vinyl-based monomer copolymerizable with vinyl chloride-based monomer is the same as described above.

In addition, the vinyl chloride-based polymer may have a polymerization degree of 1300 to 3000. In the present invention, the polymerization degree is the average polymerization degree measured according to JIS K6721-77.

Furthermore, according to still another embodiment of the present invention, there is provided a vinyl chloride resin composition including a vinyl chloride-based polymer prepared by using the preparing method, and a molded article manufactured by the same.

Specifically, the vinyl chloride resin composition may include 30 to 120 parts by weight of plasticizer on the basis of 100 parts by weight of vinyl chloride-based polymer prepared according to the above-described preparing method, and more specifically, may include 35 to 100 parts by weight. More than one kind of additives, such as a dispersion diluent, a stabilizer, a lubricant, a viscosity modifier, or a foaming agent, may further be included as needed.

The vinyl chloride resin composition may exhibit a reduced fusion time and a fusion torque by including vinyl chloride-based polymer prepared by using the above-described preparing method, and consequently, may exhibit excellent processability. As a result, a generation rate may be improved when a molding article is manufactured by using the vinyl chloride resin composition, which may be particularly useful for manufacturing a heat resistant wire coating, a gasket, and the like.

Hereinafter, the present invention will be described in more detail by examples and experimental examples. However, examples and experimental examples below are for providing examples of the present invention, and the scope of the present invention is not limited thereto.

Example 1

In a stainless-steel polymerization reactor having the inner volume 1 m³ and equipped with a reflux condenser and a stirrer, 140 parts by weight of deionized water as a polymerization solvent, 0.005 parts by weight of hydroxypropylmethylcellulose as a dispersant, 0.088 parts by weight of t-butylperoxyneodecanoate (BND) as a polymerization initiator were added, the inside of the reactor was then degassed with a vacuum pump under stirring, and then, 100 parts by weight of vinyl chloride-based monomer was added. During the entire process of the reaction, the reaction was performed while the inner temperature of the polymerization reactor was maintained at 52° C. At a time when there is a change of 1.0 kg/cm² on the basis of a equilibrium pressure at the polymerization temperature inside the polymerization reactor, 0.05 parts by weight of triethyleneglycol-bis-[3-(3-t-butyl-5-methyl-4-hydroxyphenyl)propionate as an antioxidant and 0.05 parts by weight of eugenol were added, and then the polymerization was stopped. After completing the reaction, unreacted monomer and resin slurry were respectively recovered from the polymerization reactor, the recovered resin slurry was dried with a fluidized bed dryer to obtain a vinyl chloride-based polymer.

Example 2

A vinyl chloride-based polymer was obtained by the same method described in Example 1 except for adding 0.1 parts by weight of eugenol.

Example 3

A vinyl chloride-based polymer was obtained by the same method described in Example 1 except for performing a reaction while maintaining the polymerization temperature at 47° C. and adding 0.005 parts by weight of eugenol.

Example 4

A vinyl chloride-based polymer was obtained by the same method described in Example 3 except for adding 0.1 parts by weight of eugenol.

Comparative Example 1

A vinyl chloride-based polymer was obtained by the same method described in Example 1 except for using no eugenol.

Comparative Example 2

A vinyl chloride-based polymer was obtained by the same method described in Example 3 except for using no eugenol.

Comparative Example 3

The same method described in Example 1 was performed except for simultaneously adding 0.1 parts by weight of eugenol together with a dispersant and an initiator. However, since eugenol served a role similar to the antioxidant, a polymerization reaction is not performed, and thus, the vinyl chloride-based polymer could not be obtained.

Comparative Example 4

A vinyl chloride-based polymer was obtained by the same method described in Example 1 except for adding eugenol and antioxidant to thereby stop polymerization, at the time when there was a change of 0.1 kg/cm² on the basis of the equilibrium pressure at the polymerization temperature inside a polymerization reactor.

Comparative Example 5

A vinyl chloride-based polymer was obtained by the same method described in Example 1 except for adding eugenol and antioxidant to thereby stop polymerization, at the time when there was a change of 3.0 kg/cm² on the basis of the equilibrium pressure at the polymerization temperature inside a polymerization reactor.

Manufacturing Example 1

As a plasticizer, 35 parts by weight of dioctylphthalate (DOP), as a thermal stabilizer, 2 parts by weight of an organic tin compound (MT-800, made by Songwon Industrial Co.), and 1 parts by weight of a lubricator (SONGSTAB SL-29 made by Songwon Industrial Co.) were added to 100 parts weight of vinyl chloride-based polymer prepared in Example 1 and were mixed to thereby manufacture a vinyl chloride-based thermoplastic resin composition.

Manufacturing Examples 2 to 4 and Comparative Manufacturing Examples 1 to 5

Vinyl chloride-based thermoplastic resin compositions were obtained by the same method manufacturing example 1 except for respectively using vinyl chloride-based polymers prepared in Examples 2 to 4 and Comparative examples 1 to 5.

Experimental Example

Average polymerization degrees of vinyl chloride-based polymers prepared in Example 1 to 4 and Comparative examples 1 to 5, and fusion times and fusion torques of the thermoplastic resin compositions including the vinyl chloride-based polymers were respectively measured. The results are shown in Table 1 below.

(1) Average Polymerization Degree

Measured according to JIS K6721-77.

(2) Fusion Time and Fusion Torque Measurement

With respect to the chloride-based thermoplastic resin compositions including the vinyl chloride-based polymer prepared in Examples 1 to 4 and Comparative examples 1 to 5, fusion times and fusion torques were respectively measured by using a Bradender plastograph under a condition of 140° C. and 30 rpm. As shown, the shorter the fusion time, the better the fusion property.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Eugenol added amount (parts by weight) | 0.05 | 0.1 | 0.05 | 0.1 | 0 | 0 | 0.1 | 0.05 |
| Adding time | Δ1.0 kg/cm² | Δ1.0 kg/cm² | Δ1.0 kg/cm² | Δ1.0 kg/cm² | — | — | Before polymerization | Δ0.1 kg/cm² |
| Average polymerization degree | 1300 | 1300 | 1700 | 1700 | 1300 | 1700 | ND | 1300 |
| Fusion time (second) | 274 | 255 | 518 | 495 | 304 | 576 | ND | 268 |
| Fusion torque (Nm) | 26.2 | 26.5 | 26.3 | 26.1 | 27.9 | 27.3 | ND | 26.3 |

In Table 1 above, ND means that the corresponding physical properties could not be measured since a polymerization did not occur.

As a result of experiments, in case of the thermoplastic resin composition including vinyl chloride-based polymer of Examples 1 to 4 in which eugenol was added in the last stage of polymerization, the fusion time was reduced and the fusion torque was lowered regardless of the polymerization degree and the added amount of eugenol compared to Comparative examples 1 and 2. In particular, comparing Examples 1 and 2, as the added amount of eugenol was increased, the fusion time is further reduced, but the fusion torque was at the same level. In addition, also in Examples 3 and 4 in which the polymerization degree was higher, the same result as those in Examples 1 and 2 was shown.

In addition, in case of Comparative example 4 in which the reaction was completed by adding eugenol at the time when the pressure change is 0.1 kg/cm², the physical properties of the prepared vinyl chloride-based polymer is at the same level as those in Example 1, but the generation rate of vinyl chloride-based polymer was decreased relative to the polymerization time, and thus, this case was inefficient in view of productivity. In addition, also in case of Comparative example 5 in which the reaction was completed by adding eugenol at the time when the pressure change is 3.0 kg/cm², the generation rate of vinyl chloride-based polymer was decreased relative to the polymerization time, and thus, this case was inefficient in view of productivity.

From such experimental results, it may be understood that during polymerization of vinyl chloride-based polymer, by adding eugenol at the time when the pressure change is 0.5 to 1.5 kg/cm² on the basis of the equilibrium pressure at the polymerization temperature in the polymerization reactor, the fusion time is reduced, the fusion torque is lowered, and thus, the prepared vinyl chloride-based polymer is more advantageous when molding a processed part.

The invention claimed is:

1. A method for preparing a vinyl chloride-based polymer comprising performing suspension polymerization of vinyl chloride-based monomer,
    wherein an aromatic hydrocarbon-based compound is added when a pressure change is 0.5 to 1.5 kg/cm² with respect to an equilibrium pressure at a polymerization temperature in a polymerization reactor after the vinyl chloride-based monomer is added to the polymerization reactor,
    wherein the aromatic hydrocarbon-based compound comprises a reactive functional group having an intracarbon double bond and a hydroxyl group,
    wherein the suspension polymerization is performed in a solvent in the presence of a polymerization initiator and a dispersant, and
    wherein the vinyl chloride-based polymer has a degree of polymerization of 1300 to 3000.

2. The method for preparing a vinyl chloride-based polymer of claim 1,
    wherein the aromatic hydrocarbon-based compound is a single-ring or multiple-ring aromatic hydrocarbon-based compound of 6 to 20 carbon atoms including a reactive functional group having an intracarbon double bond, a hydroxyl group and an alkoxy group of 1 to 10 carbon atoms.

3. The method for preparing a vinyl chloride-based polymer of claim 2, wherein the aromatic hydrocarbon-based compound comprises a compound of formula 1 below:

[Formula 1]

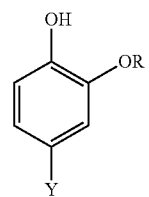

in Formula 1,
R is an alkyl group of 1 to 10 carbon atoms, and
Y is an alkenyl group of 2 to 10 carbon atoms.

4. The method for preparing a vinyl chloride-based polymer of claim 2, wherein the aromatic hydrocarbon-based compound comprises eugenol.

5. The method for preparing a vinyl chloride-based polymer of claim 1, wherein the aromatic hydrocarbon-based compound is added in an amount of 0.005 to 0.1 parts by weight on the basis of 100 parts by weight of vinyl chloride-based monomer.

6. The method for preparing a vinyl chloride-based polymer of claim 1, wherein the polymerization temperature is 40° C. to 60° C.

7. A vinyl chloride resin composition comprising the vinyl chloride-based polymer according to claim 1.

8. The vinyl chloride resin composition of claim 7 comprises 30 to 120 parts by weight of a plasticizer on the basis of 100 parts by weight of the vinyl chloride-based polymer.

* * * * *